United States Patent
Bergmann

(10) Patent No.: US 8,556,618 B2
(45) Date of Patent: Oct. 15, 2013

(54) METHOD AND BLADDER APPARATUS FOR FORMING COMPOSITE PARTS

(75) Inventor: Blaise F. Bergmann, Clearwater, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 377 days.

(21) Appl. No.: 13/082,024

(22) Filed: Apr. 7, 2011

(65) Prior Publication Data

US 2012/0256348 A1  Oct. 11, 2012

(51) Int. Cl.
*B29C 70/44* (2006.01)

(52) U.S. Cl.
USPC .......... 425/405.1; 264/313; 264/316; 425/85; 425/389

(58) Field of Classification Search
USPC ........ 425/405.1, 388, 389; 264/313, 316, 511
See application file for complete search history.

(56) References Cited

U.S. PATENT DOCUMENTS

| | | | |
|---|---|---|---|
| 5,772,950 A | 6/1998 | Brustad et al. | |
| 7,338,628 B2 * | 3/2008 | Sisk | 264/511 |
| 2005/0079241 A1 * | 4/2005 | Moore et al. | 425/388 |
| 2006/0113694 A1 * | 6/2006 | Freser-Wolzenburg et al. | 264/51 |
| 2006/0249883 A1 * | 11/2006 | Oguma et al. | 264/339 |
| 2008/0118597 A1 * | 5/2008 | Nakazato et al. | 425/405.1 |
| 2010/0201045 A1 * | 8/2010 | Schibsbye | 264/511 |
| 2013/0026675 A1 * | 1/2013 | Yoneshima et al. | 264/220 |

* cited by examiner

*Primary Examiner* — Joseph S Del Sole
*Assistant Examiner* — Nahida Sultana
(74) *Attorney, Agent, or Firm* — Hovey Williams LLP

(57) ABSTRACT

A material forming apparatus and method for shaping a material to a forming tool having complex contours. The material forming apparatus may comprise a bladder sealed to a support structure, cooperatively forming a hollow space therebetween into which air or another gas may be pumped to inflate the bladder. The forming tool may comprise a protrusion of any shape to which the material may conform. The material may be placed between the bladder and the protrusion and the support structure may be actuated toward the forming tool. As the support structure progresses toward the forming tool, an area of material pressed against the protrusion by the bladder increases in an outward direction. A pressure regulator may regulate an amount of pressure applied to the material by the bladder as the bladder presses the material against the forming tool.

8 Claims, 3 Drawing Sheets

METHOD AND BLADDER APPARATUS FOR FORMING COMPOSITE PARTS

BACKGROUND

1. Field

Embodiments of the present invention relate to a method and apparatus for forming composite material to a complex-contoured surface of a forming tool.

2. Related Art

Composite parts are generally strong and light weight, making them particularly useful in the manufacture of aircrafts. It is known in a variety of industries to form composite parts by applying pressure and heat to an uncured composite material. One method of shaping and hardening composite material into a composite part is called hot drape forming, which is a process that uses heat and vacuum to shape and cure an uncured composite material.

Specifically, hot drape forming can involve placing a vacuum bag over the composite material and sealing the vacuum bag to male tooling. The male tooling can comprise a surface having a number of contours and may include a protruded portion extending outward therefrom. Heat can be applied to the composite material to make it pliable and air is removed from between the vacuum bag and the male tooling so that the vacuum bag compresses the composite material against the male tooling, and the composite material is cured or otherwise hardened into the final composite part.

Another way to form composite parts may include both the male tooling and a matching female tooling or mold. The female tooling has a cavity formed therein with a size and shape corresponding to the protruded portion or contours of the forming tool. Uncured composite material is placed between the male and female tooling, which is then pressed together, and the composite material is cured or otherwise hardened into the final composite part. Heat can be applied during the forming process to make the composite material more conformable.

The matching male and female dies are costly to make and are not usable for any other parts having different sizes or configurations. Furthermore, the male and female die method described above is prone to inducing fiber distortion and/or wrinkling in the composite material, particularly when pressing the composite material into complex contours. The hot drape forming method is primarily limited to forming parts on tools containing convex surfaces. This method is not capable of forming parts on tools containing tight concave surfaces. Fiber distortion and wrinkles in the composite material are detrimental to the quality of the finished composite part.

Accordingly, there is a need for a method and apparatus for forming a composite part that overcomes the limitations of the prior art.

SUMMARY

Embodiments of the present invention provide a material forming apparatus comprising an inflatable bladder and a support structure. The bladder may be sealed to the support structure, cooperatively forming a hollow space therebetween. Specifically, the support structure may be a substantially concave, elongated channel, such as an elongated c-channel having a top wall, two side walls, and one or more peripheral edges. The bladder may be a sheet of flexible, inflatable material having peripheral portions or edges sealed to the support structure at or proximate to the peripheral edges of the support structure.

The material forming apparatus may further comprise a pressure regulator for regulating the amount of pressure applied to or by the bladder and an actuator for moving the support structure and bladder toward a material to be formed, such as a composite material. The material forming apparatus may also comprise and/or cooperatively function with a forming tool having a protrusion extending outwardly therefrom. The material may be formed to the shape of the protrusion using pressure provided by the bladder. The protrusion may have a width approximately equal to a width of the support structure and a height approximately equal to or less than a height of the support structure. The bladder may be substantially centered relative to the forming tool.

The pressure regulator may comprise an inlet configured for adding air or another gas into the hollow space and an outlet configured for releasing air or another gas out of the hollow space. The inlet and outlet may each extend through the support structure and/or the bladder. The pressure regulator may also comprise or be coupled to a pressure source configured for pumping air or another gas through the inlet to inflate the bladder.

The material forming apparatus may further comprise one or more sensors and a control system communicably coupled with the sensors, the actuator, and/or the pressure regulator. The control system may be configured to command the pressure regulator to increase or decrease the amount of inflation of the bladder based on feedback signals from the sensors.

A method of shaping a material, such as a composite material, on a forming tool having a protrusion extending outwardly therefrom may comprise the steps of placing the material between an inflatable bladder and the protrusion, inflating the bladder, and moving the bladder toward the protrusion until the material is pressed against an entire surface area of the protrusion. The method may also comprise the steps of monitoring and regulating an amount of pressure applied to the material and adjusting an amount of air or another gas in the bladder accordingly. Furthermore, the method may comprise the steps of heating the material to a forming temperature and curing the material after the material is pressed against the entire surface area of the protrusion.

The bladder inflating step may comprise injecting air or gas into a hollow space between the bladder and a support structure to which the bladder is sealed. The step of adjusting the amount of air or gas in the bladder may comprise pumping air through an inlet to inflate the bladder and/or releasing air through an outlet to deflate the bladder. The bladder moving step may comprise actuating the support structure toward the forming tool such that the bladder first presses the material against a top surface of the forming tool, then progressively presses the material against two side surfaces of the forming tool as the support structure moves closer to the forming tool.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
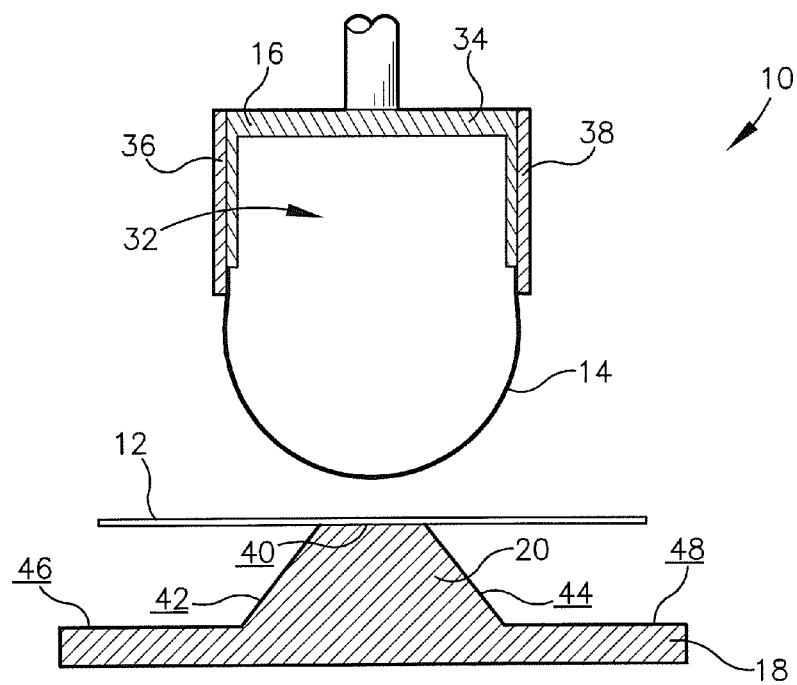
FIG. 1 is a schematic cross-sectional view of a material forming apparatus constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

As illustrated in FIGS. 1-5, various embodiments of the present invention include a material forming apparatus 10 for forming a material 12 into a composite part having one or more contours. The material 12 may comprise one or more layers of any composite material, aluminum, lead, or other formable materials that are shapeable using heat and/or forming force. The composite part may be any part, such as an aircraft stringer or other aircraft component.

Figure 2:
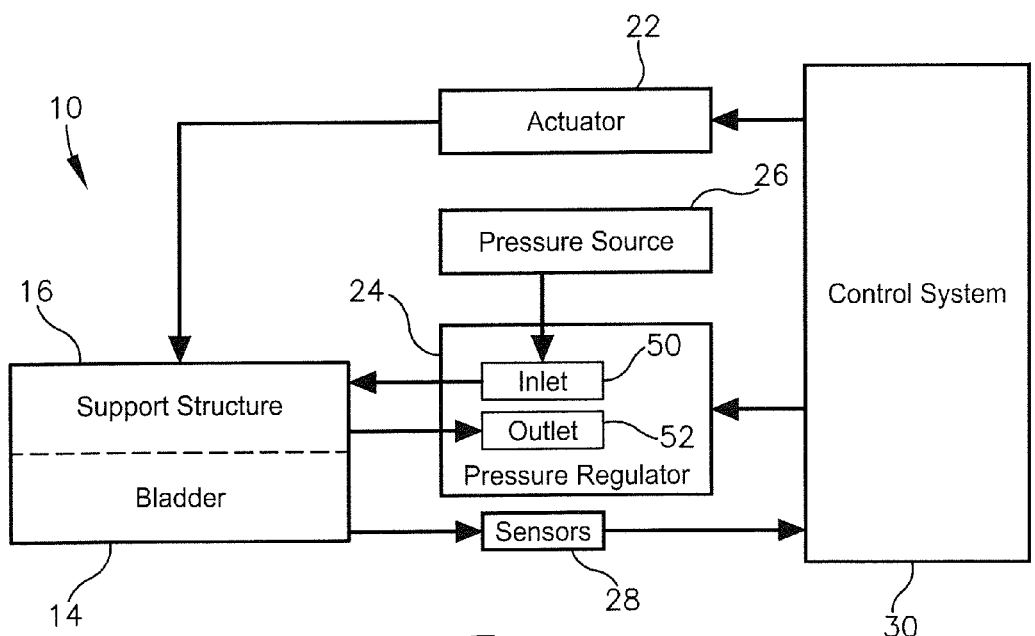
FIG. 2 is a block diagram of the material forming apparatus of FIG. 1, illustrating an input and output flow between components.

As illustrated in FIG. 1, the material forming apparatus 10 may comprise a bladder 14 and a support structure 16, and may also comprise and/or cooperatively function with a forming tool 18 having at one or more complex contours and/or at least one protrusion 20 presented thereon. As illustrated in FIG. 2, the material forming apparatus 10 may further comprise an actuator 22, a pressure regulator 24, a pressure source 26, one or more sensors 28, and a control system 30.

The bladder 14 may be any substantially impermeable, malleable, stretchable, flexible, and/or inflatable sheet of material having one or more peripheral edges. Dimensions of the bladder 14 may be controlled by either constructing it from an elastic material and properly controlling the internal inflation pressure or constructing the bladder 14 from an inelastic material with proper dimensions relative to the forming tool 18, as described below. The thickness chosen for the bladder 14 may be dependent on the amount of inflatable force to be applied thereto and the nature of the contours on the forming tool 18 to which the bladder 14 conforms. A length, width, and/or area of the bladder 14 may correspond to the dimensions of the forming tool 18 and/or its contours or protrusion 20. The bladder 14 may be sealed to the support structure 16 in such a manner as to provide a hollow space 32 therebetween. Alternatively, the hollow space 32 may be substantially surrounded by the bladder 14, and an outer surface of the bladder 14 may be fixed to and/or sealed against the support structure 16.

The support structure 16 may be a rigid, impermeable structure of any shape or configuration. In some embodiments of the invention, the support structure 16 may form an elongated channel, such as an elongated C-channel. In some embodiments of the invention, the bladder 14 may be attached and/or sealed to the support structure 16 such that a gas or liquid introduced therebetween will cause the bladder 14 to expand in a direction away from the support structure 16. For example, peripheral portions or edges of the bladder 14 may be sealed to peripheral portions or edges of the support structure 16. The support structure 16 may be a channel sized and configured to substantially correspond with a width, length, and/or height of the protrusion 20 extending outward from the forming tool 18.

In some embodiments of the invention, the support structure 16 may comprise an elongated channel with a top wall 34 and two side walls 36,38. The bladder 14 may be attached at the two side walls 36,38 and substantially sealed at opposing ends of the elongated channel. The side walls 36,38 may be spaced apart by a distance approximately equal to or only slightly greater than a total width of the protrusion 20 of the forming tool. Furthermore, a height of the two side walls 36,38 may be at least as tall as a tallest portion of the protrusion 20 extending outward and/or upward from the forming tool 18.

As described above, the forming tool 18 may comprise any surface having one or more contours and/or at least one protrusion 20 extending outward and/or upward therefrom. In some embodiments of the invention, the forming tool 18 may present a complex-contoured surface. For example, in one embodiment of the invention, the protrusion 20 of the forming tool 18 may be an elongated, trapezoidal-shaped protrusion extending from a substantially flat surface, such as in the form of an aircraft stringer. In another embodiment of the invention, the protrusion 20 of the forming tool 18 may be an elongated protrusion sized and shaped to mold an internal surface of a C-channel. In yet other embodiment of the invention, the protrusion 20 of the forming tool 18 may be an elongated protrusion having a triangular, square, rectangular, or semi-circular cross-section. For example, an elongated triangular protrusion may be used to form an L-shaped bracket.

In some embodiments of the invention, the support structure 16 and/or bladder 14 are aligned or substantially centered with a most-protruded portion of the forming tool 18, such that a center portion of the bladder 14 contacts the most-protruded portion of the forming tool 18. For example, a top surface of a trapezoid, square, or rectangle-shaped protrusion may be substantially centered with the bladder 14, or a corner of a triangular protrusion may be substantially centered with the bladder 14.

FIGS. 1 and 3-5 illustrate embodiments of the invention in which the forming tool 18 is configured to form at least part of an aircraft stringer. In this embodiment of the invention, the forming tool 18 may have an upper surface 40, two side surfaces 42,44 extending downward from the upper surface 40, and two flange surfaces 46,48 extending outward from the side surfaces 42,44. The upper surface 40 may extend through a plane substantially parallel with the flange surfaces 46,48. The two side surfaces 42,44 may each present a sloped or ramped surface relative to the flange surfaces 46,48 and the upper surface 40. The portion of the forming tool 18 between the flange surfaces 46,48 may have a substantially trapezoid-shaped cross-section. The distance between the two corners formed by the side surfaces 42,44 and the flange surfaces 46,48 may be spaced apart at a distance approximately equal to or slightly less than a the distance between the two side walls 36,38 of the support structure 16, as illustrated in FIGS. 1 and 3-5.

The actuator 22, as illustrated in FIG. 2, may be an electrically- and/or mechanically-controlled apparatus configured for actuating the support structure 16 toward and away from the material 12 and/or the forming tool 18. For example, the actuator 22 may be communicably coupled with the control system 30, such that the control system 30 may output commands to the actuator 22 to move the support structure 16 and the bladder 14 in two or more directions. In an alternative embodiment of the invention, the support structure 16 and the bladder 14 may be actuated toward and away from the material 12 and/or forming tool 18 manually by one or more operators.

The pressure regulator 24 may be any apparatus configured for increasing and/or decreasing the amount of pressure applied to the bladder 14 for inflation and deflation thereof. The pressure regulator 24 may be communicably coupled and controlled by the control system 30. In some embodiments of the invention, the pressure regulator 24 may comprise an inlet 50 and an outlet 52. In alternative embodiments of the invention, the inlet 50 and the outlet 52 may be individual and/or independent components.

The inlet 50 may be formed through the bladder 14 and/or the support structure 16 to allow air or some other gas or liquid to be pumped into or otherwise forced into the hollow space 32. For example, the inlet 50 may comprise one or more valves connected to the pressure source 26. The pressure source 26 may be any sort of air or gas pump and may be an integral component of the pressure regulator 24 and/or a stand-alone device fluidly connected to the pressure regulator 24 and/or the inlet 50. The amount of pressure introduced via the inlet 50 may be controlled by the control system 30 and/or an operator and may be varied during use of the material forming apparatus 10, as later described herein.

The outlet 52 may be formed through the bladder 14 and/or the support structure 16 to allow air or some other gas or liquid to be vented out from within the hollow space 32. For example, the outlet 52 may comprise one or more valves for releasing air or another gas and thus reducing an inflating force applied to the bladder 14. The outlet 52 may also be controlled by the control system 30 and/or an operator.

The sensors 28, depicted in FIG. 2, may comprise one or more sensors configured for determining an amount of pressure being applied to the material 12 or bladder 14 at any given point in a forming process and/or for determining how much heat is being applied to the material 12 at any given point in the forming process. For example, the sensors 28 for determining an amount of heat of the material 12 may comprise one or more thermometers or infrared sensors. The sensors 28 for determining an amount of pressure may be any sort of pressure gauge or pressure sensor known in the art. The sensors 28 may be communicably coupled with the control system 30 and configured to send signals to the control system 30 indicating an amount of heat or pressure at a particular location on the material 12 and/or the material forming apparatus 10. Other sensors may also be communicably coupled with the control system 30 for providing other types of feedback during operation of the material forming apparatus 10.

The control system 30, as illustrated in FIG. 2, may comprise any number or combination of controllers, circuits, integrated circuits, programmable logic devices, computers, processors, microcontrollers, or other control devices and residential or external memory for storing data and other information accessed and/or generated by the material forming apparatus 10. The control system 30 may be coupled with the actuator 22, inlet 50, outlet 52, pressure regulator 24, pressure source 26 sensors 28, and/or other components of the material forming apparatus 10 through wired or wireless connections, such as a data bus (not shown), to enable information to be exchanged between the various components. The control system 30 may be configured to receive signals from the sensors 28 and to adjust heat and/or pressure applied to the material 12 based on these signals. The control system 30 may also provide control signals to the pressure regulator 24. Furthermore, the control system 30 may be configured to adjust the proximity of the support structure 16 to the forming tool 18 by transmitting control signals to the actuator 22.

The features of the control system 30 may be implemented in a stand-alone device, which is then interfaced to the material forming apparatus. The control features of the present invention may also be distributed among the components of the material forming apparatus 10. Thus, while certain features are described as residing in the control system 30, the invention is not so limited, and those features may be implemented elsewhere.

The control system 30 may implement a computer program and/or code segments to perform some of the functions and method described herein. The computer program may comprise an ordered listing of executable instructions for implementing logical functions in the control system. The computer program can be embodied in any computer-readable medium for use by or in connection with an instruction execution system, apparatus, or device, and execute the instructions. In the context of this application, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The control system 30 and computer programs described herein are merely examples of computer equipment and programs that may be used to implement the present invention and may be replaced with or supplemented with other controllers and computer programs without departing from the scope of the present invention.

Figure 3:
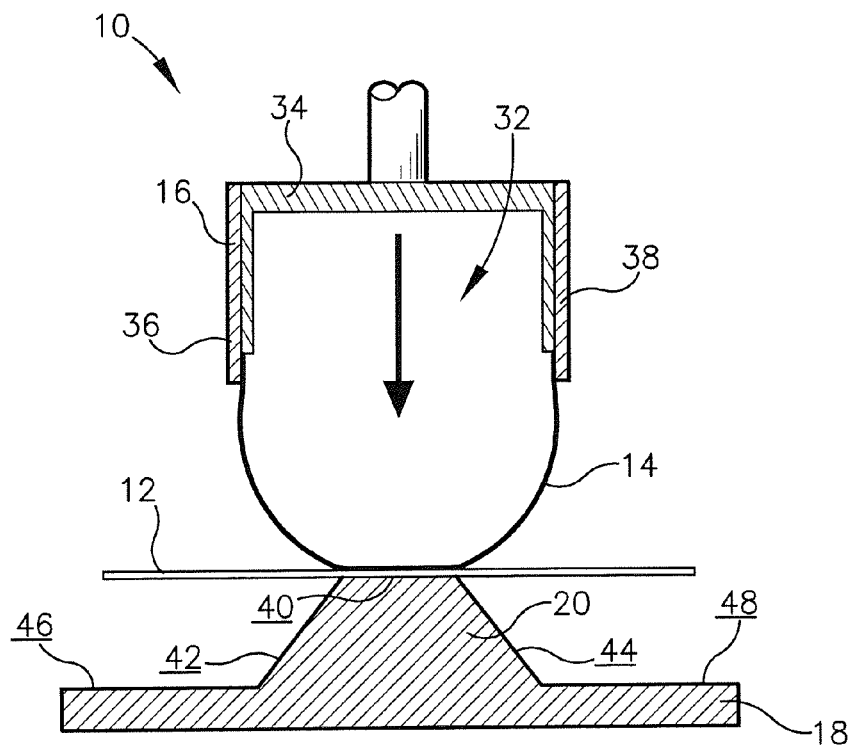
FIG. 3 is a schematic cross-sectional view of the material forming apparatus of FIG. 1 with its bladder actuated to press the material into a top surface of a forming tool.
Figure 4:
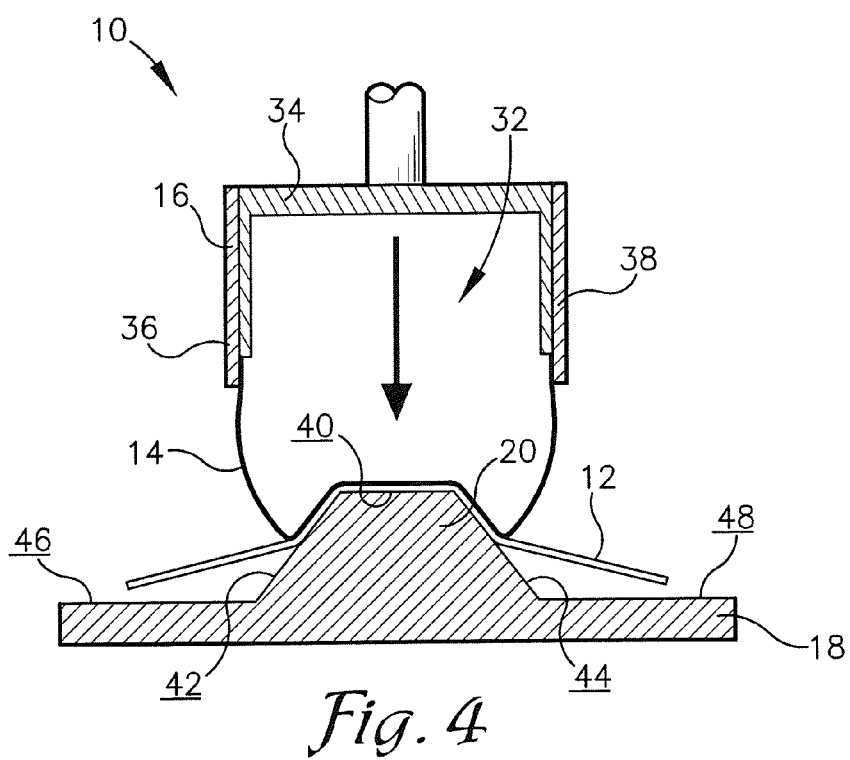
FIG. 4 is a schematic cross-sectional view of the material forming apparatus of FIG. 1 as the bladder is further actuated toward the forming tool, pressing the material into the top surface and portions of side surfaces of the forming tool.
Figure 5:
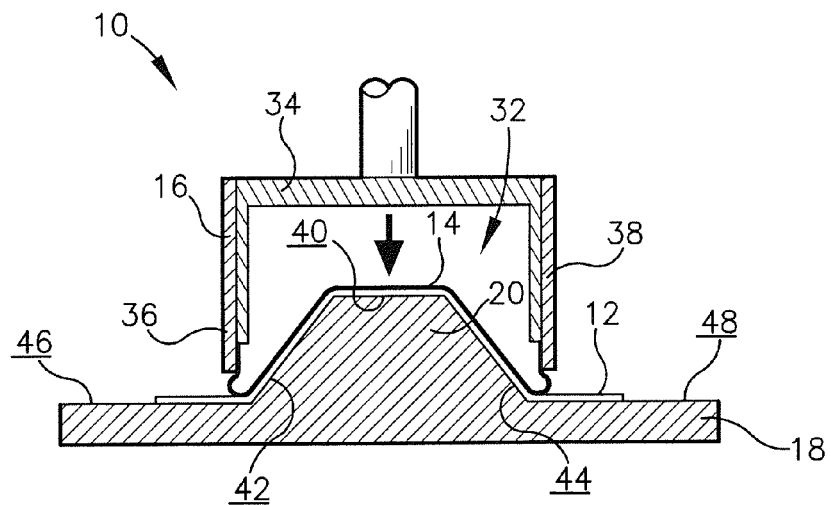
FIG. 5 is a schematic cross-sectional view of the material forming apparatus of FIG. 1 fully extended toward the forming tool, pressing the material into corners formed between the side surfaces and flange surfaces of the forming tool.

In operation, the material forming apparatus 10 may form the material 12 against the forming tool 18 by inflating the bladder 14 and actuating the support structure 16 along with the bladder 14 toward the material 12 and the forming tool 18, as illustrated in FIGS. 3-5. During inflation, the bladder 14 may expand in a convex manner, protruding outward from the support structure 16. In some embodiments of the invention, the material 12 may be heated to increase its malleability, such as by way of infrared heaters, convection heating or any other heating methods known in the art. Furthermore, the control system 30 may control the amount of pressure applied by the bladder 14 based on feedback signals provided by the sensors 28, instructions from an operator, and/or a pre-programmed sequence executed by the control system 30. The control system 30 may increase or decrease an amount of pressure via the pressure regulator 24. For example, the pressure may be increased by supplying more air through the inlet 50 and may be decreased by venting air through the outlet 52.

As the material forming apparatus 10 moves toward the material 12 and forming tool 18, the bladder 14 conforms to the forming tool 18. For example, as illustrated in FIGS. 3-5, the center portion of the bladder 14 may contact the material 12 and as the bladder 14 is pressed into the forming tool 18, the amount of surface area of the bladder 14 pressing against the forming tool 18 may progressively increase in one or more substantially outward directions.

Specifically, in some embodiments of the invention, such as embodiments configured for forming an aircraft stringer, the bladder 14 may first press the material into the upper surface 40 of the forming tool 18 (as illustrated in FIG. 3), then progressively press the material 12 down the two side surfaces 42,44 (as illustrated in FIG. 4), and then finally press the material 12 into corners formed where the flange surfaces 46,48 meet with the side surfaces 42,44 (as illustrated in FIG. 5). Peripheral portions of the material 12 not contacted by the bladder 14 may have no pressure applied thereto and may therefore naturally deform as necessary to allow the material 12 to conform to the forming tool 18. Applying pressure first at a central point and then progressively to outer portions of the material 12 may help minimize fiber distortion and/or wrinkling of the material.

Figure 6:
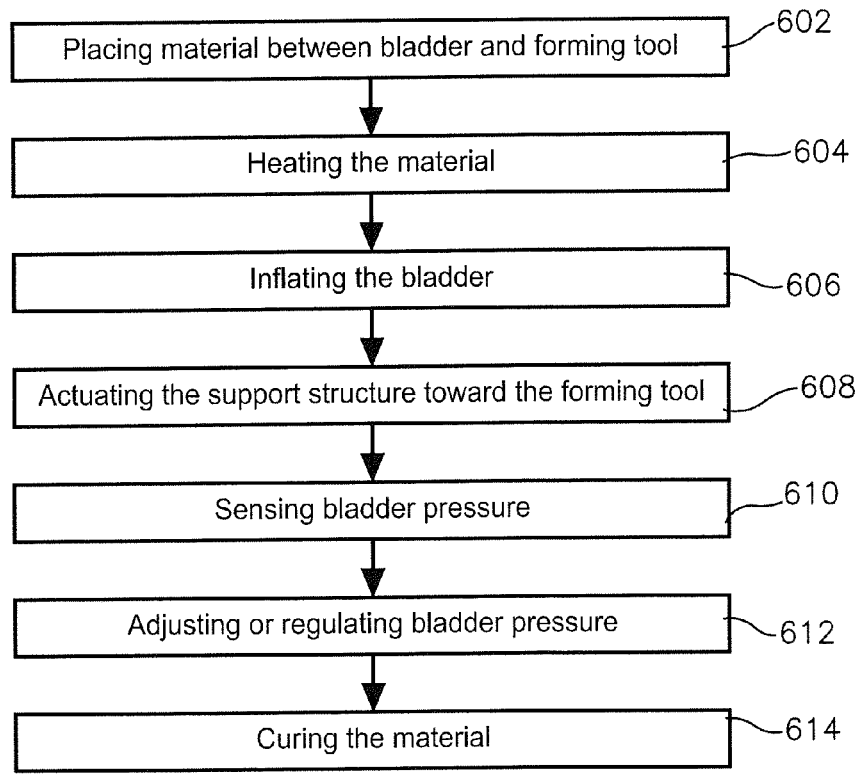
FIG. 6 is a flow chart of a method for forming the material to a shape of the forming tool in accordance with an embodiment of the present invention.

The flow chart of FIG. 6 depicts the steps of an exemplary method 600 for forming a composite part in more detail. Some of the steps of the method may be implemented with the control system 30, its computer programs, and/or other components of the material forming apparatus 10, such as the pressure regulator 24. In some alternative implementations, the functions noted in the various blocks may occur out of the order depicted in FIG. 6. For example, two blocks shown in succession in FIG. 6 may in fact be executed substantially concurrently, or the blocks may sometimes be executed in the reverse order depending upon the functionality involved.

As illustrated in FIG. 6, the method 600 of forming the material 12 to the forming tool 18 may comprise a step of placing the material 12 between the bladder 14 and the forming tool 16, as depicted in block 602. For example, the material 12 may be placed on the forming tool 18 and the bladder 14 may be inflated and/or actuated to contact the material 12, thus sandwiching the material between the bladder 14 and the forming tool 16, as illustrated in FIG. 3. Then the method 600 may comprise a step of heating the material 12 to a forming temperature, as depicted in block 604. The temperature of the material 12 and/or heating devices may be sensed by one or more of the sensors 28 and monitored by the control system 30. Furthermore, the method 600 may comprise a step of inflating the bladder 14 to a desired level, as depicted in block 606. The bladder 14 may be inflated to a point where it is substantially convex.

Next, as illustrated in FIGS. 3-5 and depicted in block 608 of FIG. 6, the method 600 may comprise a step of actuating the support structure 16 toward the forming tool 18, thereby pressing the material 12 against the forming tool 18. For example, the actuator 22 may actuate the support structure 16 toward the forming tool 18 when commanded by the control system 30 and/or an operator. The support structure 16 may be progressively actuated toward the forming tool 18 until the material 12 is pressed against substantially an entire surface area of the protrusion 20 by the bladder 14. Once the material 12 is fully pressed against the protrusion, the bladder 14 then presses the material 12 into the corners formed between the protrusion 20 and the flange surfaces 46,48. For example, in some embodiments of the invention, the actuation of the support structure 16 may stop when at least one of its peripheral edges press into or abut the flange surfaces 46,48 at or proximate to the corners formed by the flange surfaces 46,48 and the side surfaces 42,44 of the protrusion 20. Alternatively, the actuation of the support structure 16 may be stopped by the control system 30 and/or an operator once the bladder 14 has pressed the material 12 into the corners formed by the flange surfaces 46,48 and the side surfaces 42,44 of the protrusion 20.

Specifically, the present invention allows for controlling the dimensions of the bladder 14 in relation to the forming tool 18 during use so that the bladder 14 contacts the protrusion 20 first before contacting areas surrounding the protrusion 20, such as the flange surfaces 46,48. For example, the bladder may first press the material 12 against the upper surface 40 of the forming tool 18, as illustrated in FIG. 3, then press the material 12 against the two side surfaces 42,44, as illustrated in FIG. 4, before finally pressing the material 12 against the flange surfaces 46,48, as illustrated in FIG. 5. This is advantageous, because composite material may not stretch, so contacting the flange surfaces 46,48 first would cause the material 12 to become locked in place and the forming process would fail to push the material 12 against the entire surface of the protrusion 20. As mentioned above, the dimensions of the bladder 14 can be controlled by constructing it from an elastic material and properly controlling the internal pressure (as described in the subsequent method steps below) and/or constructing the bladder 14 from an inelastic material with the proper dimensions and alignment relative to the protrusion 20, as illustrated in FIGS. 3-5.

The method 600 may further comprise the step of sensing the pressure applied by the bladder 14 or present within the hollow space 32, as depicted in block 610, and then adjusting or regulating the pressure based on the sensed pressure, as depicted in block 612. For example, at least some of the sensors 28 may detect an amount of pressure applied by or present within the hollow space 32 and send a feedback signal to the control system 30 indicating this amount of pressure. The control system 30 may determine an amount of adjustment needed based on a threshold amount of pressure desired and send a signal to the pressure regulator 24 to make this adjustment. For example, as the support structure 16 moves closer to the forming tool 18, air may be vented out via the outlet 52 to maintain a constant amount of pressure within the bladder 14 as the forming tool 18 presses further into the bladder 14, decreasing the volume of the hollow space 32. However, the control system 30 may also regulate an amount of pressure applied to the bladder 14 based on input from an operator and/or programmed instructions executed by the control system 30, with or without using feedback information provided by the sensors 28.

Finally, the method may comprise a step of curing the material 12, as depicted in block 614. Once the bladder 14 fully covers or presses against the protrusion 20, the material 12 may be cured so that it maintains the shape of the forming tool 18 once the support structure 16 and the bladder 14 are actuated away from the forming tool 18. For example, depending on the material being formed, the formed composite part may be transferred to a separate tool for curing in an autoclave. The support structure 16 and bladder 14 may then be used with the same forming tool 18 or a different forming tool having a different configuration. One advantage of the present invention is that it may be used and reused with a variety of forming tools of similar dimensions.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A material forming apparatus comprising:
   an inflatable bladder;
   a support structure having peripheral edges, wherein the inflatable bladder is sealed to the support structure, cooperatively forming a hollow space between the bladder and the support structure;
   a pressure regulator configured for inflating and deflating the bladder toward and away from the support structure;
   an actuator operable to move the support structure and bladder toward and away from a material to be formed; and
   a forming tool having at least one protrusion and configured such that when the bladder is inflated and the support structure is actuated toward the material, the bladder presses the material in contact with the protrusion first, before the bladder presses the material against other portions of the forming tool surrounding the protrusion, wherein the protrusion has a width approximately equal to a width of the support structure and a height approximately equal to or less than a height of the support structure.

2. The material forming apparatus of claim 1, wherein the support structure is a substantially concave, elongated channel.

3. The material forming apparatus of claim 2, wherein the support structure is an elongated c-channel having a top wall and two side walls.

4. The material forming apparatus of claim 1, wherein the bladder is a sheet of flexible, inflatable material having peripheral portions or edges sealed to the support structure at or proximate to the peripheral edges of the support structure.

5. The material forming apparatus of claim 1, wherein the pressure regulator comprises at least one inlet configuration for adding air, liquid, or another gas into the hollow space and at least one outlet configured for releasing air, liquid, or another gas out of the hollow space, wherein the inlet and outlet each extend through at least one of the support structure and the bladder.

6. The material forming apparatus of claim 5, further comprising a pressure source configured for pumping air or another gas through the inlet to inflate the bladder.

7. The material forming apparatus of claim 1, further comprising a control system communicably coupled with at least one of the actuator and the pressure regulator.

8. The material forming apparatus of claim 7, further comprising one or more sensors, wherein the control system is configured to command the pressure regulator to increase or decrease the amount of inflation of the bladder based on feedback signals from the sensors received by the control system.

* * * * *